(12) United States Patent
Hasan et al.

(10) Patent No.: US 12,553,315 B2
(45) Date of Patent: Feb. 17, 2026

(54) METHOD OF MEASURING CARBON DIOXIDE SEQUESTRATION

(71) Applicant: PROTOSTAR GROUP LTD., London (GB)

(72) Inventors: Talal Hasan, Muscat (OM); Juerg Matter, Winchester (GB); Ehab Tasfai, Muscat (OM); Karan Khimji, Muscat (OM)

(73) Assignee: PROTOSTAR GROUP LTD., London (GB)

( * ) Notice: Subject to any disclaimer, the term of this patent is extended or adjusted under 35 U.S.C. 154(b) by 0 days.

(21) Appl. No.: 18/704,346

(22) PCT Filed: Oct. 31, 2022

(86) PCT No.: PCT/IB2022/000639
§ 371 (c)(1),
(2) Date: Apr. 24, 2024

(87) PCT Pub. No.: WO2023/073426
PCT Pub. Date: May 4, 2023

(65) Prior Publication Data
US 2025/0003314 A1 Jan. 2, 2025

Related U.S. Application Data

(60) Provisional application No. 63/274,020, filed on Nov. 1, 2021.

(51) Int. Cl.
*E21B 41/00* (2006.01)
*E21B 47/135* (2012.01)
*G01V 1/28* (2006.01)

(52) U.S. Cl.
CPC ........ *E21B 41/0064* (2013.01); *E21B 47/135* (2020.05); *G01V 1/288* (2013.01)

(58) Field of Classification Search
CPC ............ E21B 41/0064; E21B 41/0057; E21B 47/135; E21B 47/13; E21B 47/12; E21B 47/14; E21B 41/005; G01V 1/288
See application file for complete search history.

(56) References Cited

U.S. PATENT DOCUMENTS 8,524,152 B2 * 9/2013 Kelemen ................. C01B 32/60
166/305.1
9,193,594 B2 * 11/2015 Kelemen ................... C01F 5/24
(Continued)

FOREIGN PATENT DOCUMENTS

CA 2731474 C * 5/2018 ............... G01K 1/00
CA 3235946 A1 * 4/2023 ......... E21B 41/0064
(Continued)

OTHER PUBLICATIONS

Translation of CA-2731474-A1 (Year: 2011).*
(Continued)

*Primary Examiner* — Angela M Ditrani Leff
(74) *Attorney, Agent, or Firm* — Oblon, McClelland, Maier & Neustadt, L.L.P.

(57) ABSTRACT

A method of measuring a rate of mineralization, including: positioning a seismic sensor and/or a harmonic sensor in acoustic communication with a rock formation; injecting carbon dioxide into a borehole in the rock formation; reacting the carbon dioxide with the rock formation to form mineralized carbon dioxide; measuring an acoustic activity generated in the rock formation with the seismic sensor and/or harmonic sensor during the reacting; calculating the rate of mineralization based on the acoustic activity; and adjusting a rate of carbon dioxide injection into the rock formation based on the calculated rate of mineralization.

18 Claims, 2 Drawing Sheets

(56) References Cited

U.S. PATENT DOCUMENTS

| | | | |
|---|---|---|---|
| 9,266,061 B2* | 2/2016 | Greenidge | B01D 53/82 |
| 12,168,510 B2* | 12/2024 | Kowald | B64U 50/19 |
| 2011/0035154 A1* | 2/2011 | Kendall | C04B 28/10 |
| | | | 422/111 |
| 2012/0131973 A1* | 5/2012 | Greenidge | B01J 20/10 |
| | | | 423/430 |
| 2014/0186119 A1* | 7/2014 | Dusseault | E21B 41/0064 |
| | | | 405/129.2 |
| 2015/0292303 A1* | 10/2015 | Dusseault | E21B 41/0064 |
| | | | 166/305.1 |
| 2018/0080313 A1* | 3/2018 | Altundas | G01V 1/308 |
| 2023/0313645 A1* | 10/2023 | Al-Qasim | E21B 41/0064 |
| | | | 166/250.01 |
| 2024/0052726 A1* | 2/2024 | AlYousif | B01J 20/24 |
| 2024/0060397 A1* | 2/2024 | Tsuji | B01D 53/22 |

FOREIGN PATENT DOCUMENTS

| | | | |
|---|---|---|---|
| CN | 115079250 A * | 9/2022 | |
| WO | WO 2010/109340 A2 | 9/2010 | |

OTHER PUBLICATIONS

Translation of CN-115079250-A (Year: 2022).*

International Search Report issued Mar. 6, 2023 in PCT/IB2022/000639, citing references 15 and 22-25 therein, 4 pages.

Khatiwada, et al., "A Feasibility Study of Time-Lapse Seismic Monitoring of $CO_2$ Sequestration in a Layered Basalt Reservoir" Journal of Applied Geophysics, vol. 82, 2012, pp. 145-152, XP093025864.

Sim, et al., "Are Changes in Time-Lapse Seismic Data Due to Fluid Substitution or Rock Dissolution? A $CO_2$ Sequestration Feasibility Study at the Pohokura Field, New Zealand" Geophysical Prospecting, vol. 64, No. 4, 2016, pp. 967-986, XP071259444.

Krahrnbuhl, et al., "Time-Lapse Monitoring of $CO_2$ Sequestration: A Site Investigation Through Integration of Reservoir Properties, Seismic Imaging, and Borehole and Surface Gravity Data" Geophysics, vol. 80, No. 2, Mar.-Apr. 2015, pp. WA15-WA24, XP001594519.

SnæBjörnsdóttir, et al., "Carbon Dioxide Storage Through Mineral Carbonation", Nature Reviews, 2020, 13 pages, XP055970885.

* cited by examiner

METHOD OF MEASURING CARBON DIOXIDE SEQUESTRATION

CROSS REFERENCE TO RELATED APPLICATIONS

This application claims the benefit of U.S. Provisional Application No. 63/274,020, filed on Nov. 1, 2021, which is incorporated by reference in its entirety.

BACKGROUND

Technical Field

The present invention is related to a method and system for detecting, measuring and monitoring mineralization of carbon dioxide ($CO_2$) into a rock formation for sequestration and determining/calculating an amount and/or a rate of mineralization. More specifically, the present invention relates to measuring the rate and quantifying the amount of $CO_2$ sequestered into the rock formation in real time using harmonic and/or acoustic signals generated by the mineralization.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Over the past century, industrial activities, particularly fossil fuel consumption, have caused a dramatic increase of $CO_2$ concentration in the atmosphere. This anthropogenic impact on the global carbon cycle is the main reason for the observed climate change over the past decades. Global climate change has been linked to various other phenomena, including hurricanes, droughts, floods, glacier retreat, and rising sea levels. A recent United Nations Environment Program report on global warming indicates that 'human influences will continue to change atmospheric composition throughout the 21st century' and carbon dioxide makes the largest contribution out of these human activities. $CO_2$ is released into the atmosphere by the combustion of fossil fuels such as coal, oil or natural gas, and renewable fuels like biomass; by the burning of, for example, forests during land clearance; and from certain industrial and resource extraction processes. As a result, 'emissions of $CO_2$ due to fossil fuel burning are virtually certain to be the dominant influence on the trends in atmospheric $CO_2$ concentration during the 21st century' and 'global average temperatures and sea level are projected to rise'.

As such, large efforts have been made to develop effective carbon capture and storage (CCS) methods that remove $CO_2$ from the atmosphere. Chemical weathering is a natural but slow process that controls atmospheric $CO_2$ concentrations over geological time scales. Accelerating chemical weathering to counter global climate change has been proposed in the past. The goal of enhanced weathering is to hasten silicate mineral weathering rates to accelerate the removal of $CO_2$ from the atmosphere as dissolved and/or reacted inorganic carbon and/or as carbonate minerals. Because of their relatively rapid dissolution rates, enhanced weathering has focused on mafic and ultramafic rocks.

Because of its high concentration of Mg, peridotite (an ultramafic rock) which is composed largely of the mineral olivine (($Mg$, $Fe$)$SiO_4$), with lesser proportions of pyroxene minerals (($Mg$, $Fe$, $Ca$)$Si_2O$) and spinel (($Mg$, $Fe$)($Cr$, $Al$)$O$), and its hydrous alteration product serpentine ($Mg_3Si_2O_5(OH)_5$), has been considered a promising reactant for conversion of atmospheric carbon dioxide to solid carbonate. Natural carbonation of peridotite has been found to be surprisingly rapid compared to other types of rocks. For example, carbonate veins in mantle peridotite in Oman have an average age of approximately 26,000 years and are not 30 to 95 million years old as previously believed. These data and reconnaissance mappings show that approximately $10^4$ to $10^5$ tons per year of atmospheric carbon dioxide are converted to solid carbonate minerals via peridotite weathering in Oman (Kelemen and Matter, 2008). Mantle peridotite is ordinarily more than 6 km below the seafloor and is strongly out of equilibrium with air and water at the Earth's surface, and therefore, these rock formations are a viable location for $CO_2$ sequestration via mineralization.

Following, injection of $CO_2$ into underground mafic and ultramafic rock formations, the $CO_2$ reacts with the minerals in the rocks to precipitate carbonates, mainly calcium and magnesium carbonates, in the pore space of the rock formation. This process essentially permanently removes the $CO_2$ from the atmosphere on a geological time scale. Currently, it is very difficult to measure how much $CO_2$ has been mineralized in the field into geologic reservoirs. Only crude methods have been deployed for measuring and these include using chemical tracers and physical examination of liquid and rock samples. Therefore, there exists a need for real-time measurement of the rate and amount of $CO_2$ that is mineralized. Quantification allows for better reporting to government agencies on sequestered $CO_2$ and can allow organizations to trade carbon sequestration for carbon credits.

The reaction of $CO_2$ with minerals to form carbonates consumes fluid components and thereby increases the solid volume of the rock. The concurrent precipitation of the carbonates along with the increase in solid volume can thereby fracture the rocks. The fracturing process creates acoustic signals which are measurable with sensors. Therefore, it is one object of the present disclosure to provide a method of measuring the rate of mineralization of $CO_2$ based on acoustic activity measured with seismic and/or harmonic sensors. It is another object, to quantify the amount of mineralization of $CO_2$.

SUMMARY

In an exemplary embodiment, a method of measuring a rate of mineralization is disclosed. The method includes positioning seismic sensors and/or harmonic sensors in acoustic communication with a rock formation. The method further includes injecting carbon dioxide into a borehole in the rock formation. The method further includes reacting the carbon dioxide with the rock formation to form mineralized carbon dioxide. The method further includes measuring an acoustic activity generated in the rock formation with the seismic sensors and/or harmonic sensors during the reacting. The method further includes calculating the rate of mineralization based on the acoustic activity. The method further includes adjusting a rate of carbon dioxide injection into the rock formation based on the calculated rate of mineralization.

In an embodiment, the carbon dioxide is injected into the rock formation via an injection well.

In an embodiment, the carbon dioxide is dissolved in the aqueous solution.

In an embodiment, the seismic sensors and/or harmonic sensors are inside the borehole.

In an embodiment, the seismic sensor and/or harmonic sensor is a fiber optic cable for distributed acoustic sensing.

In an embodiment, a length of the fiber optic cable for distributed acoustic sensing is sufficient to reach a portion of the rock formation wherein the carbon dioxide is reacting with the rock formation to form the mineralized carbon dioxide.

In an embodiment, the seismic sensor and/or harmonic sensor are positioned on an outer surface of the rock formation.

In an embodiment, the seismic sensor and/or harmonic sensor is at least one selected from the group consisting of a geophone and a hydrophone.

In an embodiment, the method further includes measuring a pH, alkalinity and/or dissolved inorganic carbon content of a fluid composition exiting the rock formation following the reacting.

In an embodiment, the method further includes measuring a time-lapse surface gravity to monitor changes in a density of the rock formation during and/or following the reacting with a fixed gravity observation pad.

In an embodiment, the method further includes quantifying an amount of mineralization based on the rate of mineralization, the rate of carbon dioxide injection into the rock formation, the pH, the alkalinity, the dissolved inorganic carbon content, and/or the density of the rock formation.

In an embodiment, the method further includes calculating a carbon credit equivalent based on the amount of mineralization.

In an embodiment, the method further includes locating an area portion of the rock formation where the reacting takes place based on the acoustic activity.

In an embodiment, the acoustic activity includes acoustic signals having a frequency of from 0.1 to 10 kHz.

In an embodiment, the rock formation is formed from at least one material selected from the group consisting of peridotite, basalt, and gabbro.

In an embodiment, the rock formation is formed from peridotite rock.

In an embodiment, wherein the mineralized carbon dioxide is at least one selected from the group consisting of calcite, magnesite, dolomite, hydromagnesite, and siderite.

A system for measuring a rate of mineralization of carbon dioxide in a subterranean rock formation is also disclosed. The system includes a carbon dioxide source, at least one of a harmonic sensor and a seismic sensor, and at least one processor, wherein the processor is in communication with the at least one sensor and includes circuitry with instructions for calculating the rate of mineralization, and wherein the at least one sensor is disposed in the rock formation to record acoustic activity in the rock formation.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
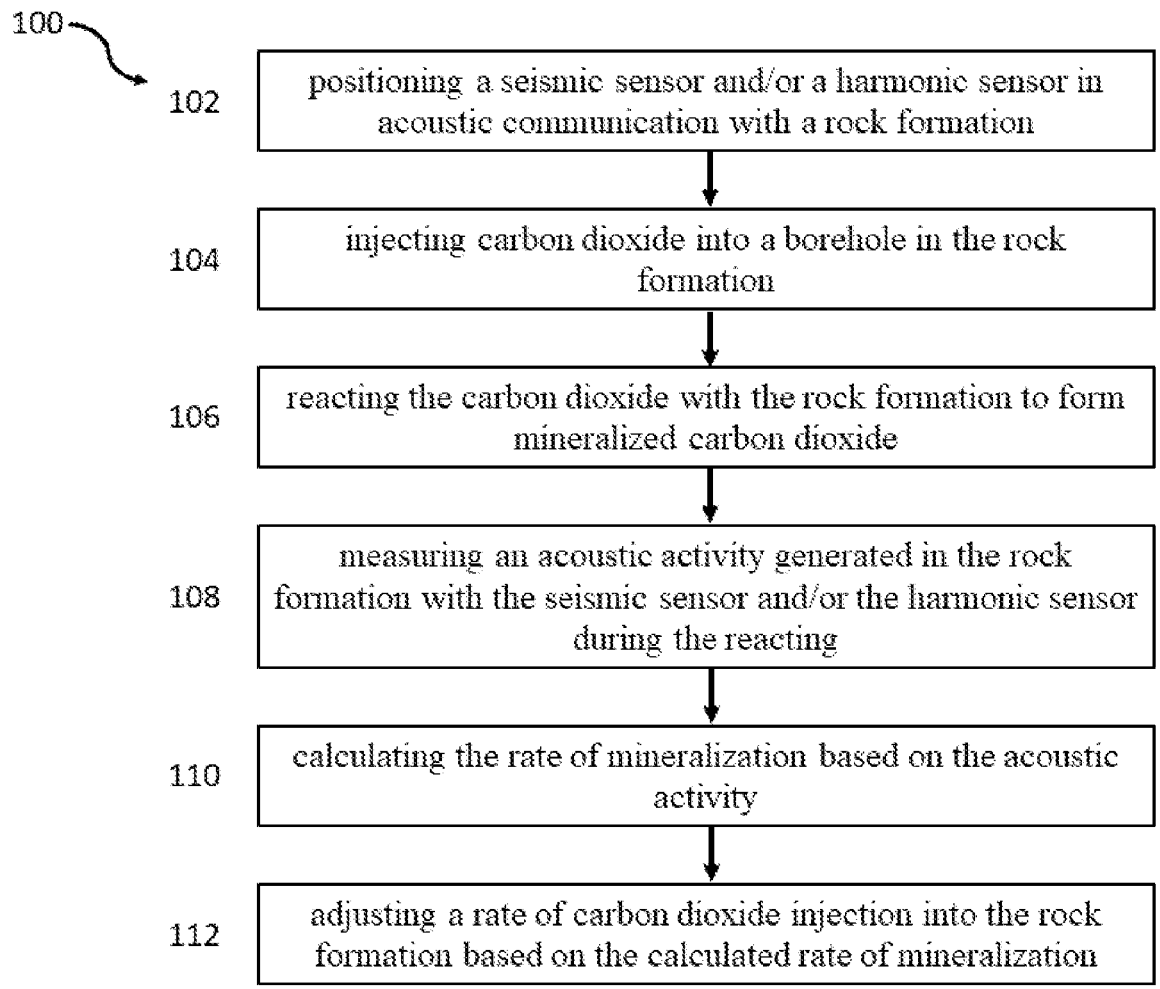
FIG. 1 is a flow chart of a method 100 of measuring a rate of mineralization, according to certain embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

All ranges disclosed herein are inclusive of the endpoints, and the endpoints are independently combinable with each other, and inclusive of all intermediate values of the ranges. Thus, ranges articulated within this disclosure, e.g. numerics/values, shall include disclosure for possession purposes and claim purposes of the individual points within the range, sub-ranges, and combinations thereof.

As used herein, a "geological formation" or "rock formation" is a body of rock having a consistent set of physical characteristics that distinguishes it from adjacent bodies of rock, and which occupies a particular position in the layers of rock exposed in a geographical region. For example, the geological formation referred to herein is consistently a mafic or ultramafic rock throughout. The geological formation may be wholly or partially subterranean and is has a composition that is mainly mafic or ultramafic minerals, preferably at least 75%, 85% or 95% by mass mafic or ultramafic rock.

As used herein, a "borehole" refers to a shaft that is drilled into the geological formation, for purposes such as extracting water, petroleum or natural gas, or mineral exploration and other environmental investigations. The borehole referred to throughout may be a borehole previously drilled for one of the purposes previously described or the borehole is drilled primarily for $CO_2$ sequestration. An average depth of the borehole is from 100 to 5,000 m, preferably 500 to 4,500 m, 1,000 to 4,000 m, 1,500 to 3,500 m, or 2,000 to 3,000 m. The borehole is drilled in any suitable location wherein the geological formation has a suitable thickness of a mafic or ultramafic rock. For example, when drilling a borehole with a 400 m depth, the location should have at least a 400 m depth of the mafic or ultramafic rock. The borehole may be empty, e.g., contain only ambient atmospheric air, or may contain other fluids such as gaseous and/or liquid hydrocarbons and/or aqueous compositions such as freshwater, salt water, seawater or formation water.

As used herein, an "injection well" is a device that places fluid deep underground into a rock formation. The injection well can be installed into the borehole to inject the liquid. For example, the liquid of the present disclosure is $CO_2$ dissolved in water. The injection well may be present mainly on the surface outside the borehole or may be fully or partially disposed inside the borehole. For example, pressurization equipment used to pressurize one or more fluids for injection into the borehole may be located outside the well preferably connected to a wellhead that is mainly outside the borehole. Other elements of an injection well such as a bore tube are preferably disposed mainly in the borehole, e.g., extending downwards into the borehole for a distance and may include devices such as packers to form a seal inside the borehole.

As used herein, "mineralization", "carbonate formation" and variations thereof, refer to the formation, e.g., precipitation, of carbonate minerals (e.g., a mineral having a carbonate ion $CO_3^{2-}$) following reaction of $CO_2$ with minerals in the rock formation.

As used herein, a seismic sensor refers to a device that senses vibrations in the earth, preferably an accelerometer that detects vibrations transmitted though rock formations. Herein, the seismic vibrations detected are part of the overall acoustic activity occurring as a consequence of mineralization. Seismic sensors are typically used to detect and measure up-down motions with frequencies from 500 Hz to 0.00118 Hz (e.g., 0.002 seconds per cycle to 850 seconds per cycle).

As used herein, a harmonic sensor refers to a device that senses sound waves in the earth. Herein, the sound waves detected are part of the overall acoustic activity. Harmonics are typically a subset of acoustic signal representing fractions of the total frequency of oscillation of a signal, e.g., fractions of the fundamental frequency of vibration.

As used herein, "acoustic activity" refers to an amount of acoustic signals detected by the seismic and or harmonic sensors. The acoustic signals are sounds released from the rock formation during the mineralization process. Acoustic signals can occur in a frequency range of 20 Hz to 20,000 Hz. Higher frequencies, e.g., greater than 5 Hz, preferably greater than 100 Hz are of especial relevance to acoustic signals generated by mineralization.

Aspects of the present invention are directed towards measuring a rate of mineralization and sequestration of $CO_2$ into a rock formation. The method involves using seismic and/or harmonic sensors to measure acoustic activity produced by the reaction of $CO_2$ in the rock formation. Although the description herein refers to the sequestration of $CO_2$, it may be understood by a person skilled in the art that aspects of the present disclosure may be directed towards sequestration of other greenhouse gases, as well. The present invention allows for autonomous verification of mineralisation quantities and rates without the need to carry out crude monitoring or sample testing of actual rock samples.

The rock formation of the present disclosure may be any suitable rock formation for $CO_2$ sequestration, including but not limited to rock formations made of mafic and ultramafic rocks. Mafic rock is a silicate or igneous rock rich in magnesium and iron and include but are not limited to basalt, diabase and gabbro. Minerals in mafic rocks include but are not limited to olivine, pyroxene, amphibole, and biotite. Ultramafic rocks are igneous and meta-igneous rocks with less than 45% silica and a high amount of magnesium and potassium, and include but are not limited to periodite and dunite. Minerals in ultramafic rocks include but are not limited to olivine, pyroxene, serpentine and brucite.

Olivine, pyroxene, brucite, and serpentine are known to be active in the presence of solubilized $CO_2$ producing various carbonate rocks, hence their use in $CO_2$ sequestration. In some embodiments of the present invention, a solubilized carbon dioxide (water-$CO_2$ mixture) is injected into mafic and ultramafic rock formations containing olivine, serpentine, brucite, and pyroxene. In an embodiment, the rock formation is preferably a peridotite rock formation. Consequently, $CO_2$ can be converted into magnesite ($MgCO_3$), calcite ($CaCO_3$), and dolomite ($CaMg(CO_3)_2$) and stored permanently in the rock formation in mineral form. Other carbonates formed include but are not limited to hydromagnesite ($Mg_5(CO_3)_4(OH)_2 \cdot 4H_2O$), and siderite ($FeCO_3$).

Olivine rocks often contain magnesium, oxygen, and silicon. Olivine is the most abundant mineral in the earth's mantle until a depth of 700 km. The composition is usually a combination of $SiO_4$ and $Mg^{2+}$. Typically, silicon bonds with 4 oxygen molecules forming a pyramid structure so that the charges of cations and anions are balanced, and $Mg^{2+}$ occupies the empty space between the $SiO_4$ structure. These bonds can be easily triggered to react with carbonic acid. The reaction of olivine with $CO_2$ can be accomplished by the following reaction pathway:

$$MgSiO_4 + 2CO_2 \rightarrow 2MgCO_3 + SiO_2 \qquad [1]$$

It is also proven that the rate of reaction increases significantly by introducing water. Water helps $CO_2$ to be solubilized forming carbonic acid and therefore making the mineralization and ion exchange process far easier and more efficient. Below is the reaction pathway in presence of water:

$$CO_2 + H_2O \rightarrow H_2CO_3 \rightarrow H^+ + HCO_3^- \qquad [2]$$

$$Mg_2SiO_4 + 4H^+ \rightarrow Mg_2^+ + SiO_2 + 2H_2O \qquad [3]$$

$$Mg^{2+} + HCO_3^- \rightarrow MgCO_3 + H^+ \qquad [4]$$

Pyroxene is one of the groups in an inosilicate mineral, which is also abundantly found in mafic and ultramafic rocks. The general chemical formula for pyroxene is $ABSi_2O_6$, in which A and B can be ions such as calcium, magnesium, aluminum, etc. Most commonly, pyroxene can be found as $CaMgSiO_6$. Naturally, pyroxene reacts with $CO_2$ according to the following equation:

$$CaMgSi_2O_6 + 2CO_2 \rightarrow CaMg(CaCO_3)_2 (dolomite) + 2SiO_2 \qquad [5]$$

However, similar to olivine, water increases the rate of reaction, below is the reaction pathway in presence of water:

$$CaMgSi_2O_6 + CO_2 + H_2O \rightarrow Ca_2Mg_5Si_8O_{22}(OH)_2 + CaCO_3 + SiO_2 \qquad [6]$$

Pyroxene and olivine can also simultaneously react with solubilized $CO_2$ to form carbonates. In the presence of water and $CO_2$, the following reaction occurs:

$$Mg_2SiO_4(olivine) + CaMgSi_2O_6(pyroxene) + 2CO_2 + 2H_2O \rightarrow Mg_3Si_2O_5(OH)_4(serpentine) + CaCO_3(calcite) + MgCO_3(magnesite) \qquad [7]$$

Serpentine reacts with $CO_2$ as follows:

$$Mg_3Si_2O_5(OH)_4 + 3CO_2 \rightarrow 3MgCO_3 + 2SiO_2 + 2H_2O \qquad [8]$$

Brucite reacts with $CO_2$ as follows:

$$Mg(OH)_2 + CO_2 \rightarrow MgCO_3 + H_2O \qquad [9]$$

The present invention discloses a method of measuring a rate of formation of the carbonates and of measuring an amount of $CO_2$ that is mineralized in the form of carbonates. The reactions of [1]-[9] result in the formation of calcium and magnesium carbonates at the pore space of the rock formation where $CO_2$ is in direct physical contact with a reactive rock surface. These reactions consume fluid components including liquid water and dissolved or gaseous $CO_2$ thereby resulting in an increase in the solid volume of the rock by 5-50%, preferably 10-40% or 20-30% relative to the initial solid rock volume. The reaction forms a carbonate mineral which precipitates or effloresces on the surface of the rock. Thus, the precipitation of carbonate minerals in the pore space in mafic and ultramafic rocks along with the concurrent volume increase, can fracture rocks. This process is called 'reaction-driven cracking' and occurs in situ in the rock formation. The cracking due to mineralization generates detectable acoustic and seismic signals, which are exploited by the present invention to determine the rate, location, and/or quantity of the mineralization in the rock formation.

Figure 2:
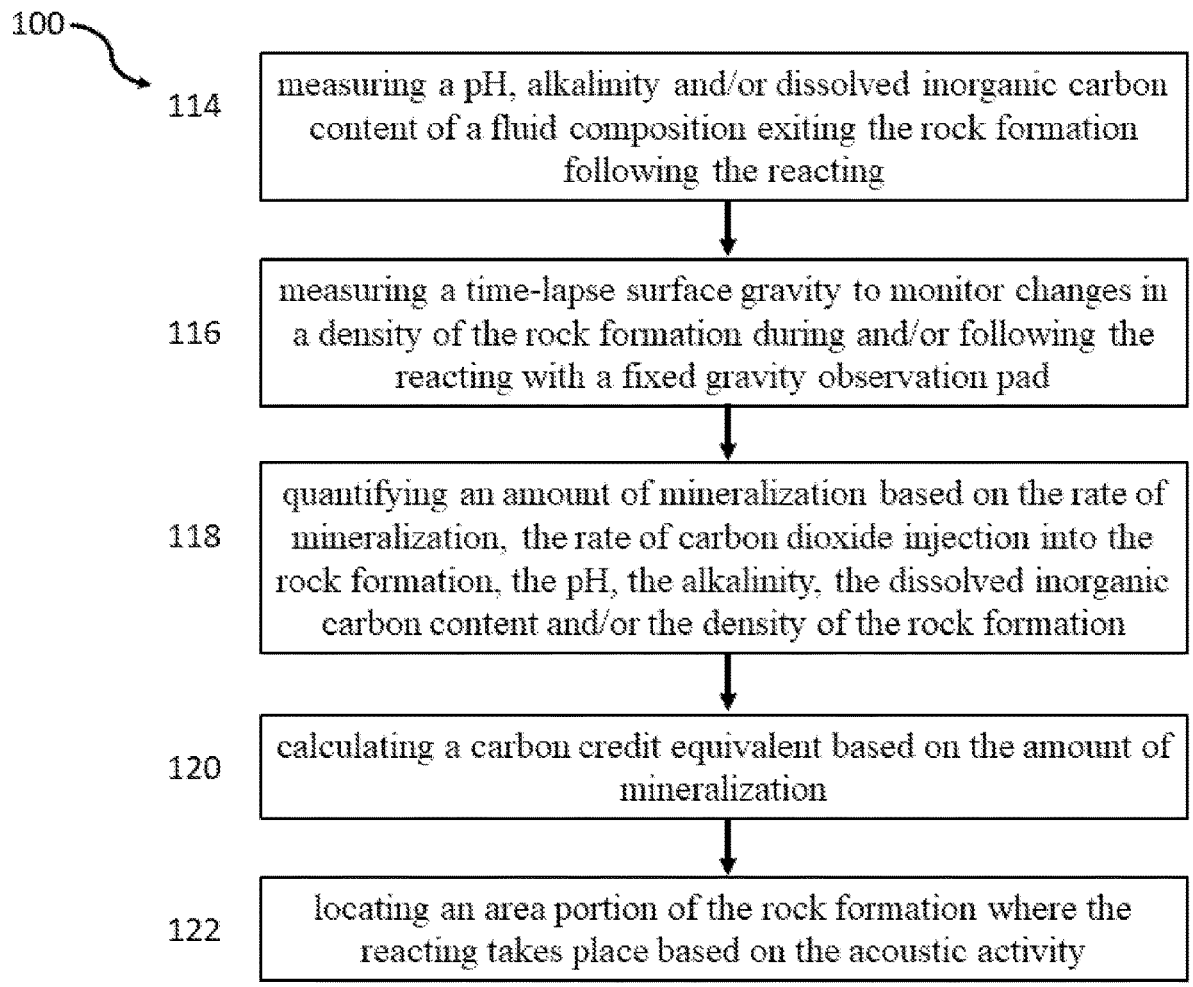
FIG. 2 is a flow chart of further steps of the method 100, according to certain embodiments of the present disclosure.

Referring to FIGS. 1 and 2, a flow chart of a method 100 of is illustrated. The order in which the method 100 is described is not intended to be construed as a limitation, and any number of the described method steps can be combined in other orders to implement the method 100. Additionally, individual steps may be removed or skipped from the method 100 without departing from the spirit and scope of the present disclosure.

In an embodiment, the method 100 at step 102 includes positioning seismic sensors and/or acoustic/harmonic sensors at a location(s) such that the sensor is in acoustic communication with a rock formation. The seismic sensor and/or acoustic/harmonic sensor is suitable to measure the acoustic signals produced during the reaction-driven cracking in the subterranean geological formation. In an embodiment, "acoustic communication" means that the seismic sensor and/or a harmonic sensor are in range to be able to detect the acoustic signals produced during the reaction-driven cracking in the subterranean geological formation. In an embodiment, the seismic sensor and/or harmonic sensor is positioned inside of a borehole into which $CO_2$ is to be injected. In an embodiment, the seismic sensor and/or harmonic sensor is positioned on an outer surface of a rock formation proximal to a borehole into which $CO_2$ is to be injected, i.e., the sensor is not inside of the borehole but can still detect signal from the outside surface. The sensor may be disposed a distance from the point at which mineralization is taking place but preferably the sensor is in direct physical contact with the rock formation. To avoid interference with seismic and acoustic signals generated by the injection of $CO_2$ composition into a rock formation the sensor is preferably disposed in a borehole in the rock formation that is not used for injection of water or $CO_2$.

In some embodiments, the seismic sensor and/or harmonic sensor is selected from the group consisting of a fiber optic cable for distributed acoustic sensing, a geophone and a hydrophone. In an embodiment, a hydrophone is in acoustic communication with the $CO_2$-containing fluid that is injected into the borehole through an injection well, preferably at the surface. A hydrophone is a microphone designed to be used underwater for recording or listening to underwater sound.

In an embodiment, a geophone is positioned on the outer surface of the borehole and is a device that converts ground movement (seismic vibrations) into voltage. The hydrophone and/or geophone can measure sounds (acoustic signals) and/or seismic signals produced during the mineralization of $CO_2$.

Distributed acoustic sensing systems detect vibrations by observing acoustic energy using optical fibers. Fiber optic networks along a borehole are utilized and turned into a distributed acoustic sensor, capturing real-time acoustic and seismic data. An interrogator sends a coherent laser pulse along an optical fiber (sensor cable). Scattering sites within the fiber cause the fiber to act as a distributed interferometer with a gauge length like the pulse length (e.g. 10 meters). Acoustic disturbance on a fiber generates microscopic elongation or compression of the fiber (micro-strain), which causes a change in the phase relation and/or amplitude. Before the next laser pulse can be transmitted, the previous pulse must have had time to travel the full length of the fiber and for its reflections to return. Hence the maximum pulse rate is determined by the length of the fiber. Therefore, acoustic signals can be measured that vary at frequencies up to the Nyquist frequency, which is typically half of the pulse rate. In some embodiments, a length of the fiber optic cable for distributed acoustic sensing is sufficient to reach a portion of the rock formation wherein the carbon dioxide is reacting with the rock formation to form the mineralized carbon dioxide. In some embodiments, the fiber optic cables are distributed on the walls of the borehole throughout the length of the borehole.

Other acoustic measurement sensors (to measure ambient noises), accelerometers, pressure transducers, microphones, or similar sensors may also be employed to measure other parameters, such as temperature to provide temperature corrections and calibrations or for data consistency checks for all the sensors. Measuring nearby ambient surface noise using microphones, geophones, accelerometers or similar sensors can help in improving signal to noise by rejecting well-known and measured surface noises. Sensors measuring chemical composition and density of the pumped fluid may be used to improve analysis and are therefore implemented in some embodiments as described later.

In an embodiment, the method 100 at step 104 includes injecting carbon dioxide into a borehole in the rock formation. In an embodiment, the carbon dioxide to be injected, is dissolved in an aqueous solution or a $CO_2$ rich aqueous-mixture. In some embodiments, the $CO_2$ is injected into the rock formation via an injection well. In some embodiments, the injected carbon dioxide is in gaseous form.

In a preferred embodiment of the invention the carbon dioxide dissolved in an aqueous solution is injected into a borehole of a geologic formation via an injection well at a temperature of preferably 25-185° C.±15° C., preferably 50-150° C., 75-125° C. or approximately 100° C. As recognized by one of skill in the art, cooler temperatures are capable of dissolving greater amounts of $CO_2$, however it is also recognized that mineralization reactions occur faster at higher temperatures with a maximum reaction rate at 185° C.±15. In an embodiment, the amount of carbon dioxide in the aqueous solution is from 500 to 10,000 ppm, preferably 1,000 to 9,000 ppm, 2,000 to 8,000 ppm, 3,000 to 7,000 ppm, 4,000 to 6,000 ppm or approximately 5,000 ppm. In an embodiment, the aqueous solution is fresh water, saline water, brackish water and/or seawater. In a preferable embodiment, a supercritical (e.g., at a pressure of greater than 5 MPa) mixture of $CO_2$ and water is injected into a rock formation through a borehole. Supercritical $CO_2$ water mixtures may contain upwards of 5 wt % $CO_2$ at 10 MPa based on the total weight of the supercritical $CO_2$ water mixture.

Preferably the $CO_2$ rich fluid-mixture is injected into the geologic formation at pressures substantially less than those necessary in order to mechanically fracture the formation, e.g., pressures in the range of ambient borehole or downhole pressure to generally less than 1 MPa and preferably in the range of from 100-1,000 psi, 200-900 psi, 300-800 psi, 400-700 psi, or 500-600 psi. The gas pressure in the pressurized water stream is set to be below or close to the hydrostatic pressure at the target injection depth. The $CO_2$ rich fluid-mixture is then injected through a well head including an injection well at the entrance of the borehole. The injection well head is preferably connected through a non-corrosive pipe (e.g., tubing) to a packer system that is installed just above the target injection zone. The packer system hydraulically isolates the column for injection of $CO_2$ rich fluid-mixture into the peridotite rock formation. The injected $CO_2$ rich fluid-mixture is dispersed through the annulus in the borehole within the peridotite formation where the dissolved $CO_2$ reacts in-situ with the peridotite rocks. During the injecting the $CO_2$ rich fluid-mixture migrates through the rock formation such that the $CO_2$ contacts the rock formation at points other than the borehole-rock formation interface. As the $CO_2$ rich fluid-mixture migrates through the rock formation and $CO_2$ reacts with the rock formation the concentration of $CO_2$ in the $CO_2$ rich fluid-mixture rich fluid-mixture decreases.

At step 106 of the method 100, the method includes reacting the carbon dioxide with the rock formation to form mineralized carbon dioxide. The reaction to form mineralized carbon dioxide may be as described in formulas [1]-[9] to form calcite, magnesite and/or dolomite. The reaction may also form any other suitable carbonate. In an embodiment, the reaction occurs from 1 hour to 100 days, preferably less than 90 days, 80 days, 70 days, 60 days, 50 days, 40 days, 30 days, 20 days, 10 days, 1 day, or less than 12 hours. The reacting produces carbonates with an increased volume compared to the original rock formation, which results in fracturing of the rock, where the fracturing produces an acoustic signal.

At step 108 of the method 100, the method includes measuring an acoustic activity with the seismic sensor and/or harmonic sensor during the reacting. As described previously the sensors either on the outside surface of the rock formation or inside the borehole can measure the acoustic signals produced during the fracturing of the rock, labeled as the acoustic activity. In an embodiment, the acoustic activity preferably includes acoustic signals having a frequency of from 0.1 to 10 kHz, preferably 0.2 to 9 kHz, 0.3 to 8 kHz, 0.4 to 8 kHz, 0.5 to 7 kHz, 0.6 to 6 kHz, 0.7 to 5 kHz, 0.8 to 4 kHz, 0.9 to 3 kHz, or 1 to 2 kHz.

At step 122 the method further includes locating an area portion of the rock formation where the reacting takes place based on the acoustic activity. The location of the origin of the acoustic signal in the rock formation may be determined by detecting the acoustic signal with a plurality of sensors or a seismic array which data in turn permit calculation of the location of origin and other information such as direction and length of fracture etc. Based on the location of the signals produced, it is possible to locate where in the rock the reactions are taking place. This information can give insight into areas of the rock that are more reactive than others and/or that have the capacity to store more $CO_2$. In an embodiment, injection of the $CO_2$ may be shifted towards areas with higher reactivity. This information can also provide insight as to when a location can no longer react with the $CO_2$ and thereby $CO_2$ should no longer be injected in that area.

In an embodiment, the method 100 at step 110 includes calculating the rate of mineralization based on the acoustic activity. The signals from the sensors are amplified, filtered, captured (recorded and stored), digitized, and transferred to a computer or similar device for processing. In an embodiment, the signals are transferred through a hard wired system to a computer for processing. In an embodiment, the signals are transferred through a network to a computer for processing. Based on variables such as but not limited to the amount of $CO_2$ injected into the geological formation, the amount of time that has passed, and acoustic activity, the rate of mineralization can be calculated. In an embodiment, the rate is calculated in real time based on the acoustic activity measured with the fiber optic cables for distributed acoustic sensing.

Preferably, the rate and/or amount of mineralization occurring in the rock formation is determined by correlating the received acoustic signal with a standard or trend line measured separately. For example, a rock sample of the rock formation is tested under laboratory conditions to detect, measure and monitor the emission of acoustic signals as the rock sample is contacted with a $CO_2$ rich fluid mixture. Several aspects of the acoustic signal may be monitored and recorded as a basis from which to calculate the rate and/or amount of mineralization including the signal frequency, signal intensity, signal location and signal rate. Further, conditions such as the change in concentration of $CO_2$ during contact of the $CO_2$ rich fluid mixture with the rock sample, e.g., measured spectroscopically or analytically, can also be used as a basis for correlating $CO_2$ mineralization with acoustic signal activity. These data may be used independently or in combination as a basis for determining the amount and/or rate of mineralization occurring in the rock formation. In another technique for establishing a standard, trend line or predictive tool for calculating mineralization rate and/or amount, a $CO_2$ depleted fluid mixture collected from a second borehole representing the product of the migration of the $CO_2$ rich fluid mixture through the rock formation is tested spectroscopically and/or analytically for $CO_2$ concentration as a function of time. These data may then be used determine a differential in the amounts of $CO_2$ between the $CO_2$ rich injection fluid injected in the first borehole and the "spent" ($CO_2$ depleted fluid mixture) fluid recovered at the second borehole. The differential $CO_2$ concentration, time of travel of the $CO_2$ rich fluid mixture through the rock formation and the measured acoustic signal (e.g., intensity, frequency, rate or location) may be used as a basis for establishing a trend line useful for calculating the amount of $CO_2$ mineralization occurring in real time. In a further embodiment, the frequency and/or intensity of acoustic signals may be used as a basis for determining a change in volume of the rock formation occurring during the reacting. A change in the mineralogy and the volume of the rock formation is correlated with a change in density occurring when $CO_2$ is mineralized in the rock formation. This likewise provides a basis from which a real time measure of $CO_2$ mineralization can be derived.

In an embodiment, the method 100 at step 112 includes adjusting a rate of carbon dioxide injection into the rock formation based on the calculated rate of mineralization. For example, if the rate of mineralization is high, more $CO_2$ can be sequestered into the rock formation and if the rate is low or no mineralization is taking place, then injection of $CO_2$ may need to be moved to another location.

At step 114 the method 100 further optionally includes measuring a pH, an alkalinity and/or dissolved inorganic carbon content of a fluid composition exiting the rock formation following the reacting. Dissolved carbon dioxide concentration, pH and alkalinity change because of the $CO_2$ injection and subsequent mineralization. As $CO_2$ is removed from the system due to mineralization, the pH of the fluid increases because $CO_2$ forms carbonic acid in water. The pH, alkalinity, and dissolved inorganic carbon data can then provide constraints or indicator for the acoustic activity data provided from the harmonic, seismic and/or acoustic sensors to calculate the total mass of $CO_2$ mineralized. The pH, alkalinity, and/or dissolved inorganic carbon sensor is any suitable sensor for an aqueous solution, including but not limited to a combination sensor, a differential sensor, a laboratory sensor, and a process sensor. One, two or all three of these properties may be measured simultaneously.

At step 116 the method 100 further includes measuring a time-lapse surface gravity to monitor changes in a density of the rock formation during and/or following the reacting with a fixed gravity observation pad. Mineralization of carbon dioxide inside of the rock formation results in a change in rock density of 0.2 to 0.6 g/cm$^3$, resulting in a gravity anomaly of 0.1 to 0.5 mGal, which is detected by a time-lapse gravity survey. Changes in the gravity indicate that $CO_2$ has been reacted to form mineralized carbon dioxide in the rock formation. An algorithm can then convert the change in gravity to mass of carbonate precipitated in the subsurface pore space. This along with the pH data and the acoustic activity data can provide information about the amount of $CO_2$ that has been mineralized/sequestered in the rock formation.

At step 118 the method 100 further includes quantifying an amount of mineralization based on the rate of mineralization, the rate of carbon dioxide injection into the rock formation, the pH, the dissolved inorganic carbon content, the alkalinity, and/or the density of the rock formation. Any combination of these properties can be used to quantify the amount of mineralization. In an embodiment, all of the above properties are used to quantify the amount of mineralization. In some embodiments, two, three, four, five, or six of the above properties are used to quantify the amount of mineralization. Data from the harmonic and/or seismic sensors on the acoustic activity of the mineralization reaction, provides the main data set for calculating the overall amount of $CO_2$ that has been mineralized/sequestered in the rock formation, while the rate of carbon dioxide injection into the rock formation, the pH, the alkalinity, the dissolved inorganic carbon content and the density of the rock formation provide constraints to the data set.

In an aspect, a system for measuring a rate of mineralization, includes a carbon dioxide source, at least one of a harmonic sensor and a seismic sensor, and at least one processor. The carbon dioxide source can be from any known carbon dioxide emitter, including but not limited to a powerplant or a $CO_2$ pipeline. Following injection of the $CO_2$ into a rock formation, the at least one of a harmonic sensor and/or a seismic sensor measure acoustic signals produced by the mineralization of the $CO_2$ in the rock formation. The processor is in communication with the at least one sensor and includes circuitry with instructions for calculating the rate of mineralization. In an embodiment, the signals are communicated to the processor through a hard wired system. In an embodiment, the signals are communicated to the processor through a network. In an embodiment, the signals are communicated to the processor and the rate of mineralization is calculated in real time. In an embodiment, the sensors are attached to a control system of the entire sequestration operation to detect sensor measurements, analyze the measurements and provide possible feedback control loops to optimize operations and correlate multitude of data streams for final processing.

Another aspect of the present disclosure relates to the digitization or real-time monetization associated with the process by which carbon (e.g., $CO_2$) is sequestered such as by the mineralization of $CO_2$ in geologic formations, either by chemical reaction with the geological formation or by thermodynamic processes such as absorption. In an effort to reduce greenhouse gas (GHG) emissions, national and international organizations have imposed carbon credits on emitters of GHGs. A carbon credit is a permit representing the right to emit one ton of carbon dioxide or another GHG equivalent to one ton of carbon dioxide. Markets for trading carbon credits already exist with a nascent trading community. While still in its early stages the carbon credit markets serve the purpose of providing an economic clearance mechanism embodied for example in a trading platform for carbon sequestration capacity with buyers and sellers exchanging carbon credits for value.

Governments have established taxation frameworks to encourage carbon sequestration. For example, Section 45Q of the US Internal Revenue Code provides tax credits for sequestered carbon denominated in metric tons of a qualified carbon dioxide. The tax credit provides an incentive for companies to invest in carbon sequestration activities by offering offsets to tax liabilities. This supports the establishment of an industry that finds and brings carbon sequestration capacity into production. The mineralization of carbon dioxide by injection into mafic and ultramafic rock is one such source of carbon sequestration capacity.

One substantial difficulty encountered in prior attempts to economically incentivize carbon sequestration arose from the difficulties associated with measuring, quantifying, verifying and auditing the amount of sequestered carbon dioxide. Likewise the "quality" of sequestration, e.g., expected term (lifetime) of carbon capture, was not reliably characterized. Biological processes for carbon sequestration such as forest growth or other photosynthesis-based processes by which carbon dioxide is captured in soil or living organic matter, rely heavily on estimates that must be verified in the field. Measurements of carbon sequestration in soils or biological materials is resource intensive, expensive and complex. Accurate measurement of biologically sequestered carbon suffers from great expense and cannot be measured in real time. This weakness in objectively accounting for carbon sequestration process presents a substantial hurdle to further implementation and widespread use of a carbon credit economy.

The process and systems described herein provide a solution to the disadvantages of conventional carbon sequestration accounting. In one aspect of the present disclosure, carbon sequestration rates are determined in real time, e.g., can be immediately marketed and/or counted as inventory/assets. Real time data that is objective and accurate permits economic quantification corresponding to the amount of carbon actually sequestered in the form of mineralized carbon dioxide and thus real time (immediate) monetization of mineralized carbon dioxide, e.g., carbon credits that can be actively traded on an exchange platform.

Further in contrast to biological carbon sequestration processes, carbon dioxide mineralization is essentially permanent on a geological time scale. Carbon captured in biological systems has a relatively limited lifetime in a sequestered (captured) form and readily escapes into the atmosphere through climatic events or environmental changes such as fire, deforestation, erosion and drought. Carbon dioxide mineralization is therefore of relatively greater value and thus is more easily marketable and/or is marketable at a premium on carbon credit or carbon sequestration markets.

The process described herein provides a means to immediately validate and accredit carbon credits. The resulting carbon credits may thus be ISO 14064 compliant. Immediate validation, verification and/or accreditation also permits accurate auditing for tax and accounting purposes. In distinction to conventional verification and validation of carbon credits, the process described herein does not need to rely on historical information or estimates. The process eliminates the need for the intensive field studies needed to conventionally validate or verify biologically sequestered carbon dioxide. In an embodiment, the method 100 at step 120 includes calculating a carbon credit equivalent based on the amount of mineralization.

The invention claimed is:

1. A method of determining a rate of mineralization, comprising:
    positioning a seismic sensor and/or a harmonic sensor in acoustic communication with an igneous or meta-igneous rock formation, wherein the rock formation comprises mafic rocks or ultramafic rocks;
    injecting carbon dioxide dissolved in an aqueous solution into a borehole in the rock formation;
    reacting the carbon dioxide with the rock formation to form mineralized carbon dioxide;
    measuring an acoustic activity generated in the rock formation with the seismic sensor and/or the harmonic sensor during the reacting;
    calculating the rate of mineralization based on the acoustic activity; and
    adjusting a rate of carbon dioxide injection into the rock formation based on the calculated rate of mineralization.

2. The method of claim 1, wherein the carbon dioxide is injected into the rock formation via an injection well.

3. The method of claim 1, wherein the seismic sensor and/or harmonic sensor are inside the borehole.

4. The method of claim 1, wherein the seismic sensor and/or harmonic sensor is a fiber optic cable for distributed acoustic sensing.

5. The method of claim 4, wherein a length of the fiber optic cable for distributed acoustic sensing is sufficient to reach a portion of the rock formation wherein the carbon dioxide is reacting with the rock formation to form the mineralized carbon dioxide.

6. The method of claim 1, wherein the seismic sensor and/or harmonic sensor are positioned on an outer surface of the rock formation.

7. The method of claim 1, wherein the seismic sensor and/or harmonic sensor is at least one selected from the group consisting of a geophone and a hydrophone.

8. The method of claim 1, further comprising:
    measuring a pH, alkalinity and/or dissolved inorganic carbon content of a fluid composition exiting the rock formation following the reacting.

9. The method of claim 8, further comprising: measuring a time-lapse surface gravity to monitor changes in a density of the rock formation during and/or following the reacting with a fixed gravity observation pad.

10. The method of claim 9, further comprising:
    quantifying an amount of mineralization based on the rate of mineralization, the rate of carbon dioxide injection into the rock formation, the pH, the alkalinity, the dissolved inorganic carbon content, and/or the density of the rock formation.

11. The method of claim 10, further comprising:
    calculating a carbon credit equivalent based on the amount of mineralization.

12. The method of claim 1, further comprising:
    locating an area portion of the rock formation where the reacting takes place based on the acoustic activity.

13. The method of claim 1, wherein the acoustic activity includes acoustic signals having a frequency of from 0.1 to 10 kHz.

14. The method of claim 1, wherein the rock formation is formed from at least one material selected from the group consisting of peridotite, basalt, and gabbro.

15. The method of claim 1, wherein the rock formation is formed from peridotite rock.

16. The method of claim 1, wherein the mineralized carbon dioxide is at least one selected from the group consisting of calcite, magnesite, dolomite, hydromagnesite, and siderite.

17. The method of claim 1, wherein the carbon dioxide dissolved in the aqueous solution is injected into the borehole in the rock formation via an injection well at a temperature of 50-150° C.

18. The method of claim 1, wherein the amount of carbon dioxide in the aqueous solution is from 500 to 10000 parts per million by weight.

* * * * *